UNITED STATES PATENT OFFICE.

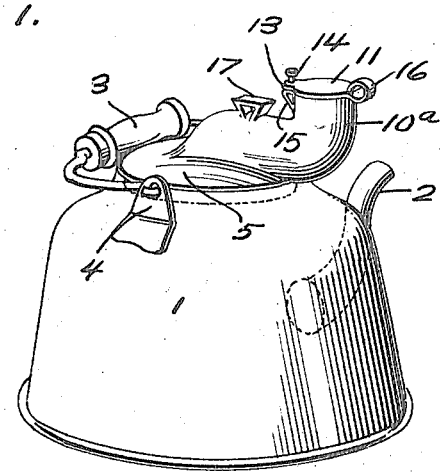
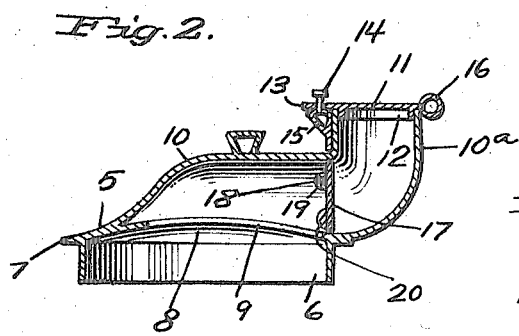
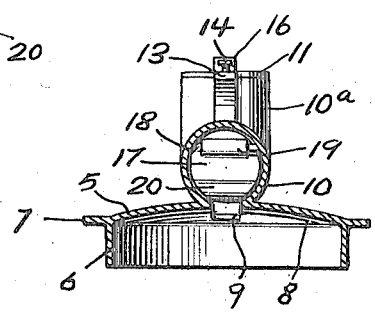

PHILIP FRANSMANN, OF FREEHOLD, NEW JERSEY.

TEA-KETTLE COVER.

1,248,472. Specification of Letters Patent. Patented Dec. 4, 1917.

Application filed June 15, 1917. Serial No. 174,955.

*To all whom it may concern:*

Be it known that I, PHILIP FRANSMANN, a citizen of the United States, residing at Freehold, in the county of Monmouth and State of New Jersey, have invented certain new and useful Improvements in Tea-Kettle Covers, of which the following is a specification.

This invention relates to tea kettle covers, and more particularly to a cover for a tea kettle, provided with means for filling the kettle without removing the cover.

One of the main objects of the invention is to provide a device of the character stated of simple construction and operation which may be readily applied to a tea kettle of standard construction and may be produced at relatively small cost. A further object is to provide a cover having a filling tube or pipe formed integral therewith the cover being provided with an opening communicating with said tube. A still further object is to provide a cover having a filling tube and means mounted within the tube for preventing a sudden out-rush of steam from the interior of the kettle such as would tend to scald a person's hand when filling the kettle. Further objects will appear from the detailed description.

In the drawings:

Figure 1 is a perspective view of a tea kettle with a cover constructed in accordance with my invention applied.

Fig. 2 is a central vertical section through the cover.

Fig. 3 is a section taken in a plane at right angles to Fig. 2.

The kettle 1, which may be of any suitable construction, is provided with a pouring spout 2 and bail or handle 3 secured thereto by means of tabs 4. This kettle is provided, in its top, with the usual circular opening adapted to receive the cover 5 having the depending flange 6 and the annular shoulder 7 which rests upon the upper edge of the kettle about the opening thereof when the cover is in normal position.

Cover 5 is provided with the upwardly arched top 8 having a central slot 9 which extends substantially the full width of the top. An approximately L-shaped filling tube 10 is formed integral with the cover and communicates directly with the slot 9. The outer vertical arm $10^a$ of tube 10 is closed by a cover 11 having an inner depending flange 12 which fits snugly within the upper end of arm $10^a$. This cover is provided with an integral ear 13 apertured to receive the shank of a headed pin 14 secured in a bracket 15 mounted on the vertical arm $10^a$ of the filling tube. The distance between the upper face of ear 13 and the under face of the head of pin 14 is such as to permit the cover 11 to be lifted vertically out of the upper end of the outer arm of the filling tube, for which purpose the filling tube cover is provided with tubular finger grip 16 formed integral therewith. When the cover is thus lifted out of the upper end of $10^a$ it may be turned inward over the kettle cover 5 so as to be supported by the supporting member 17 extending upward from the horizontal arm of the filling tube provided for this purpose. When the filling tube has been thus opened, the water may be poured directly into the same, and flows through the opening or slot 9 into the interior of the kettle.

By providing the filling tube I eliminate all danger of scalding a person's hand such as occurs when it is attempted to fill a kettle containing water which has been heated to the boiling point having the ordinary cover which has to be removed, the water being poured directly into the opening through the top of the kettle while it is held in the user's hand. As an additional safeguard against scalding of the person's hand I provide a swinging valve 17 which is pivotally supported in the outer end of the horizontal arm of the tube by means of a pintle 18 inserted through a sleeve 19 formed integral with the valve. As will be noted from Figs. 2 and 3 of the drawings, the pintle 18 is positioned above the center of valve 17 and extends transversally of the horizontal arm of the filling tube so that the valve is normally maintained in substantially vertical position as shown. This mounting of the valve permits liquids to be easily poured through the tube through the opening 9 of cover 5, the valve 17 swinging inwardly and upwardly about pintle 18 during this operation. The valve is further provided with an integral lug or enlargement 20 at its lower end, this enlargement acting as a weight to hold the valve in vertical position so as to close the tube. When the water is poured into the vertical arm $10^a$ the valve 17 will swing inwardly so as to permit this water to flow freely into the interior of the kettle through the slot 9, and the valve will act to effectually prevent any sudden out-rush of steam such as would scald a person's hand when the cover 11 of the filling tube is lifted, the valve being loosely mounted so as to permit a certain amount of steam to escape slowly about the same.

It will be evident that there may be slight changes made in the construction and arrangement of the different parts of my invention without departing from the field and scope of the same, and I intend to include all such changes, as fall within the scope of the appended claim, a preferred form only of my invention being disclosed in this application.

What I claim is:

A cover provided with an approximately L-shaped filling tube, the inner arm of which is substantially horizontal and is secured to the top of the cover, said cover being provided with an opening through its top communicating with said horizontal arm of the tube, and a valve mounted in the horizontal arm of the tube adjacent the outer end thereof and beyond the opening through the cover, said valve being suspended for free swinging movement about an axis above its center and transversally of the horizontal arm of the tube so as to be normally maintained in a substantially vertical position and permit fluids to flow through said filling tube.

In testimony whereof I affix my signature in presence of two witnesses.

PHILIP FRANSMANN.

Witnesses:
JOSEPH McDERMOTT,
J. R. BAIRD.

Copies of this patent may be obtained for five cents each, by addressing the "Commissioner of Patents, Washington, D. C."